Nov. 19, 1963 V. G. RAVIOLO 3,111,092
LEVACAR GUIDANCE SYSTEM
Filed Dec. 28, 1961 3 Sheets-Sheet 1
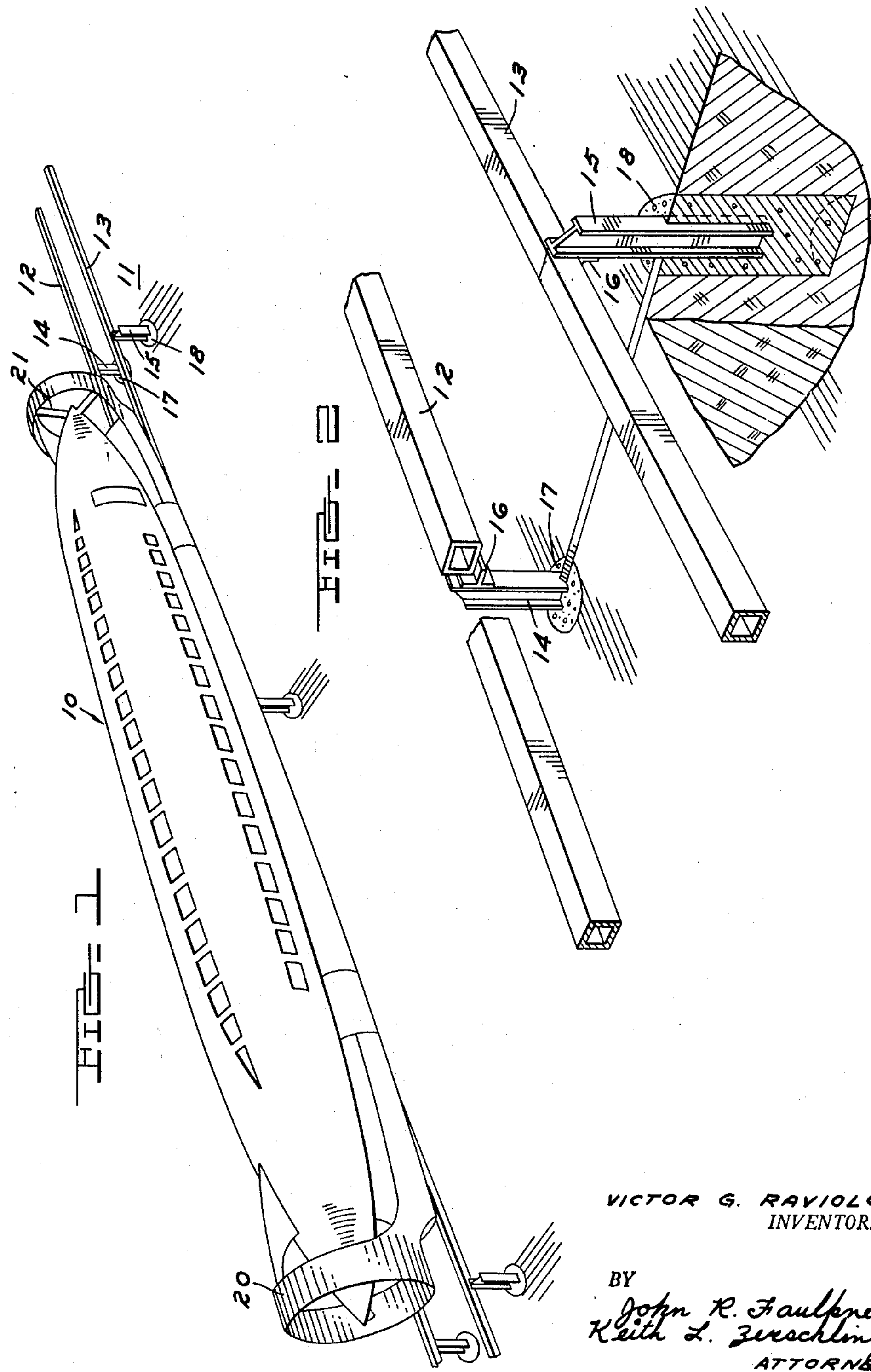
VICTOR G. RAVIOLO
INVENTOR.
BY
John R. Faulkner
Keith L. Zerschling
ATTORNEYS

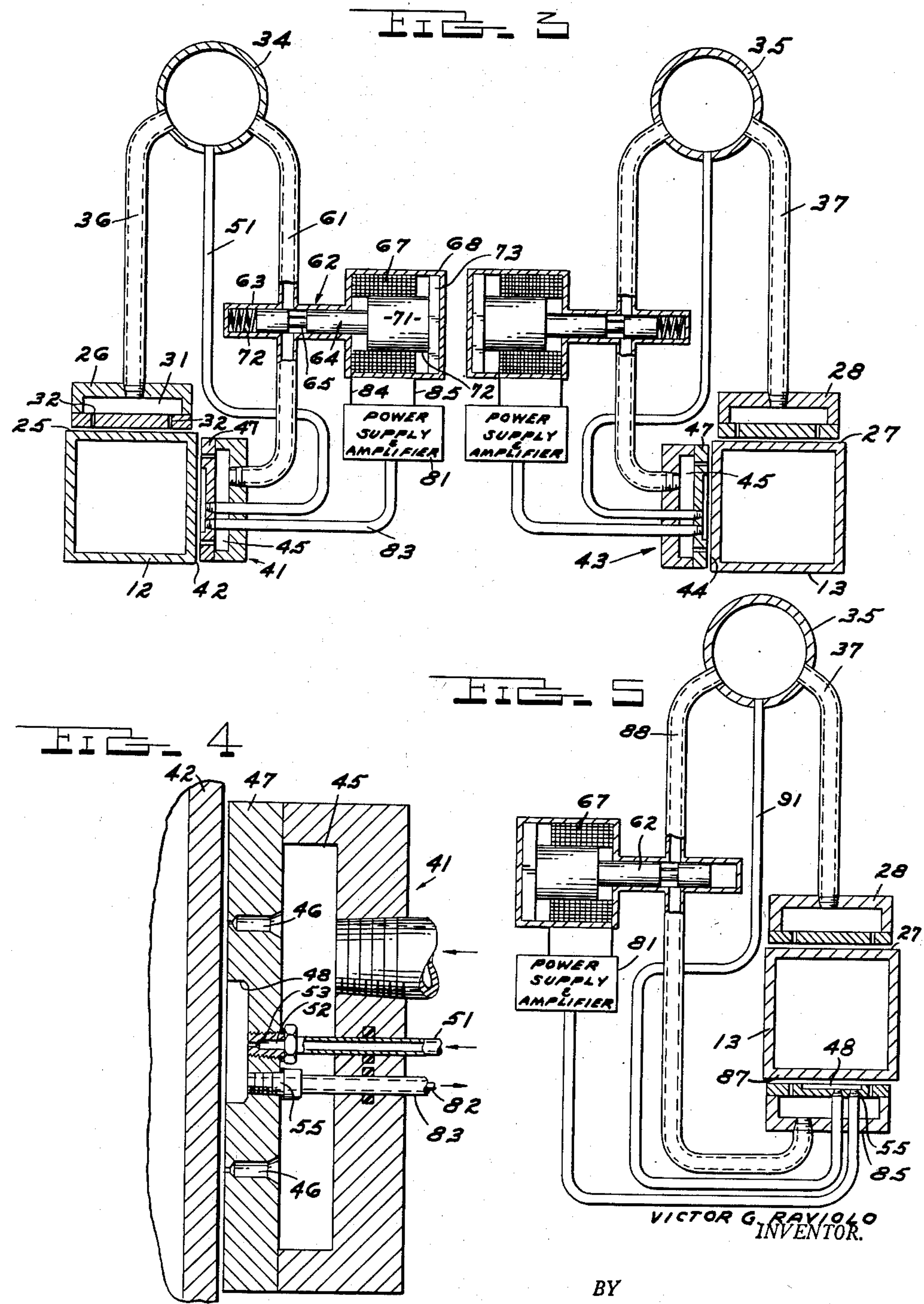
VICTOR G. RAVIOLO
INVENTOR.
BY John R. Faulkner
Keith L. Zerschling
ATTORNEYS

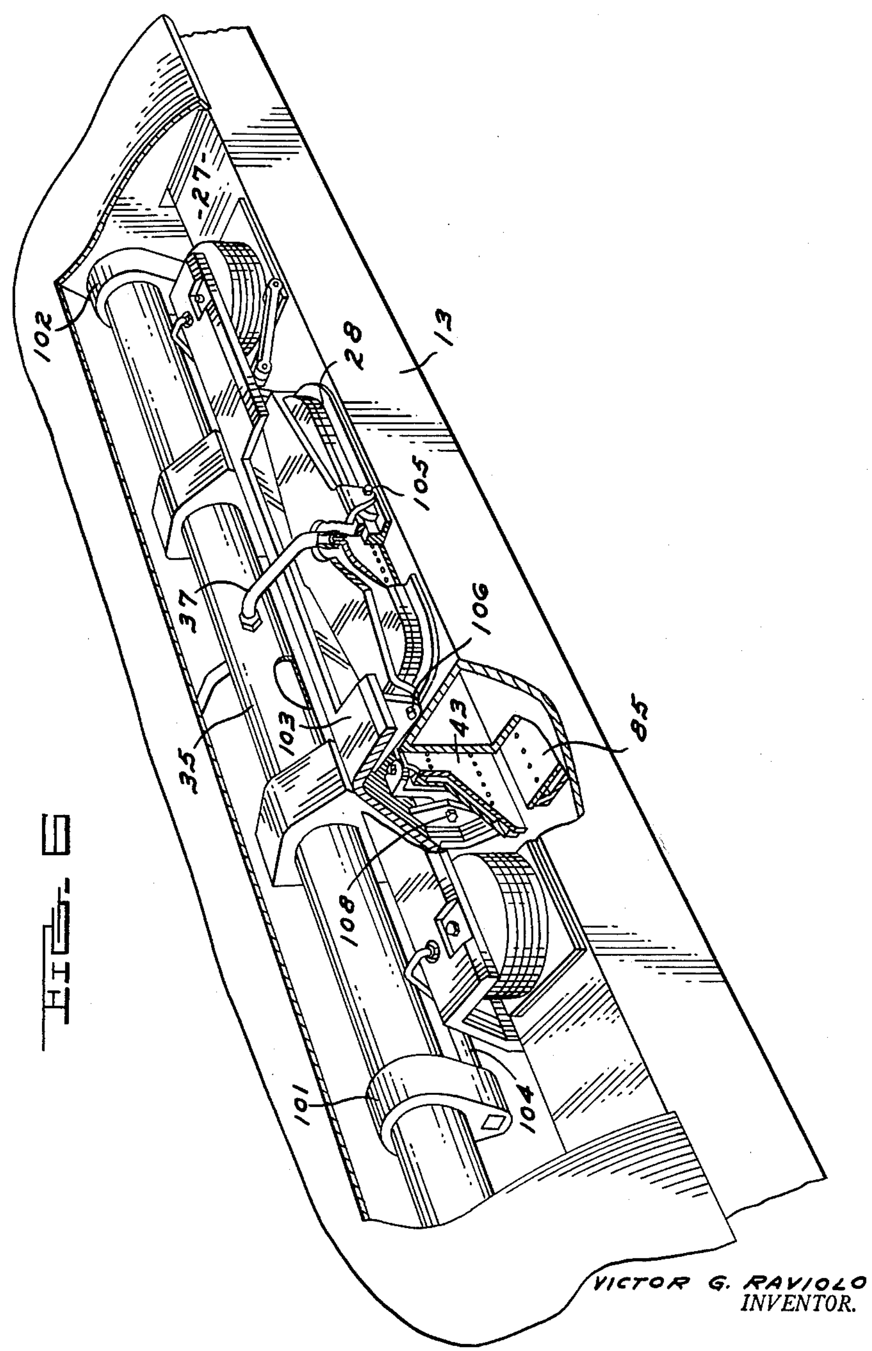
VICTOR G. RAVIOLO
INVENTOR.
BY
John R. Faulkner
Keith L. Zerschling
ATTORNEYS United States Patent Office 3,111,092
Patented Nov. 19, 1963

3,111,092

LEVACAR GUIDANCE SYSTEM

Victor G. Raviolo, Dearborn, Mich., assignor to Ford Motor Company, Dearborn, Mich., a corporation of Delaware Filed Dec. 28, 1961, Ser. No. 162,843
14 Claims. (Cl. 104—134)

This invention relates to a vehicle supported from a rail system by means of gas under pressure and more particularly to means in such a vehicle for controlling or restricting its lateral and/or vertical movement.

In a copending application Serial No. 765,114, filed October 3, 1958, in the names of David J. Jay and Harlan W. Peithman, now Patent No. 3,055,312, and assigned to the assignee of this invention, there is disclosed a high speed transportation system in which a vehicle is supported from surfaces, preferably a rail system, by means of gas pressure levitation devices that supply a thin film of gas under pressure between the devices and the tops of the rails. Gas pressure levitation devices are also positioned in opposed relationship to the side surfaces of the rails. A full supply of gas under pressure is continuously fed to these gas pressure levitation devices to continuously supply a thin film of gas under pressure between these devices and the sides of the rails to control or restrict lateral movement of the vehicle. This vehicle is also supplied with a plurality of gas pressure levitation devices positioned in opposed relationship to the under surface of the rails to resist upward forces on the vehicle that may be created by aerodynamic lift conditions during high speed travel. These levitation devices are also continuously supplied with a full supply of gas under pressure.

This invention provides an improvement over the above described vehicle by supplying a full supply of gas under pressure only to those levitation devices that are active in resisting lateral or upward movement of the vehicle. Means are provided for increasing the supply of gas under pressure to a gas pressure levitation device when it moves toward a surface of the rail system. This results in a considerable saving in the amount of gas under pressure that is needed to control the lateral or upward movement of the vehicle.

In the preferred embodiment of the invention, a small amount of gas under pressure is continuously supplied between a gas pressure levitation device and a surface of the rail system positioned in opposed relationship to the levitation device. A pressure sensing means is positioned to sense the pressure of the gas between the levitation device and the surface of the rail and to produce an output signal proportional to the pressure. It can be appreciated that this pressure will increase when the levitation device moves toward the surface of the rail system. The pressure sensing means is connected to means positioned between a source of gas under pressure and the gas pressure levitation device, preferably a solenoid operated valve. This means increases the supply of gas under pressure to the gas pressure levitation device when the pressure sensed reaches a selected level. Thus, when either lateral forces or forces tending to lift the vehicle are applied, the mechanism of this invention comes into operation to resist these forces and to restrict the lateral or upward movement of the vehicle.

An object of the invention is to provide a means for controlling the lateral or upward movement of a vehicle supported from a rail system by means of gas under pressure.

Another object of the invention is the provision of a means for controlling the lateral or vertical movement of a vehicle supported from a rail system by means of gas under pressure in which gas under pressure is selectively supplied to resist lateral or vertical movements.

A further object of the invention is the provision of a means for controlling the lateral or vertical movement of a vehicle supported on a rail system by gas under pressure which increases the supply of gas to means active in resisting lateral or vertical forces applied to the vehicle.

Other objects and attendant advantages of the present invention will become more fully apparent as the specification is considered in connection with the attached drawings in which, FIG. 1 is a perspective view of the vehicle and rail system of the present invention;

FIG. 2 is a perspective view partially in section of the rail system of the present invention;

FIG. 3 is a schematic diagram of the present invention showing means for controlling the lateral movement of the vehicle;

FIG. 4 is an enlarged sectional view of a gas pressure levitation device of the present invention;

FIG. 5 is a schematic diagram of the invention showing means for controlling the upward or vertical movement of the vehicle; and FIG. 6 is a perspective view partially in section of the means for supporting gas pressure levitation devices in opposed relationship to certain surfaces of the rail system.

Referring now to the drawings in which like reference numerals designate like parts throughout the several views thereof, there is shown in FIG. 1 a vehicle 10 positioned upon a rail system 11.

As fully shown in FIG. 2, this rail system may consist of a pair of box-like rails 12 and 13 that are supported from pillars 14 and 15 by means of T sections 16. The pillars 14 and 15 are supported from the ground by means of concrete foundations 17 and 18.

The vehicle 10 is suitable for carrying a number of passengers, and it includes a pair of propellers 20 and 21 positioned at either end thereof for propelling it over the rail system. The vehicle is supported from the rail system by means of a plurality of gas pressure levitation devices that are positioned in opposed relationship to the substantially horizontal portions of the rails 12 and 13.

Referring now to FIG. 3, there is shown a cross sectional view of a preferred embodiment of the invention including the two rails 12 and 13. The rail 12 has a substantially horizontal section or surface 25 having a gas pressure levitation device 26 positioned in substantially opposed relationship thereto, and the rail 13 has a substantially horizontal section or surface 27 having a gas pressure levitation device 28 positioned in opposed relationship thereto. These gas pressure levitation devices may be of the type described in copending application Serial No. 744,416, filed June 25, 1958, in the names of David J. Jay and Harlan W. Peithman and assigned to the assignee of the present invention. They include a plenum 31 and a plurality of orifices, certain of which are designated by the numeral 32. A pair of pipes 34 and 35 contain gas under pressure, preferably air under pressure, that may be supplied by means of a compressor (not shown) driven by the power plant (not shown) of the vehicle. A conduit 36 connects pipe 34 with gas pressure levitation device 26, while a conduit 37 connects pipe 35 with gas pressure levitation device 28. Thus, gas under pressure is continuously supplied to gas pressure levitation devices 26 and 28 to support the vehicle from the rail system by means of gas under pressure.

The present invention provides means for controlling or restricting the lateral movement of the vehicle on the rail system. It also provides means for restricting the vertical movement of the vehicle on the rail system that may result from vertical forces applied to the vehicle from aerodynamic lift conditions. These means furnish a film of gas under pressure between the means and an appropriate surface of the rail system. Additional means are provided for increasing the supply of gas to these means when the means moves toward the surfaces.

In FIG. 3, there is shown means for restricting the lateral movement of the vehicle when it is subjected to an unbalanced lateral or side load. As shown here, a gas pressure leviation device 41 is positioned in opposed relationship to a surface or section 42 of the rail 12. This section or surface 42 may be positioned in a vertical plane, however, it need only have a substantial vertical component. Another gas pressure levitation device 43 is positioned in opposed relationship to a similar surface or section 44 of rail 13.

As can be most readily seen from an inspection of FIG. 4 which shows an enlarged sectional view of gas pressure levitation device 41, each of these gas pressure levitation devices has a plenum 45 and a plurality of orifices 46 positioned in a member 47. The member 47 of gas pressure levitation device 41 is positioned in opposed relationship to the surface 42 of rail 12, while member 47 of gas pressure levitation device 43 is positioned in opposed relationship to the surface 44 of rail 13. It is to be understood that the gas pressure levitation device 43 is identical in structure to gas pressure levitation device 41.

The member 47 includes a small chamber 48 that is continuously supplied by a small or sensing stream of air or gas under pressure. This is accomplished by means of a conduit 51 that is connected to supply pipe 34, and to a connector 52 that is threaded into the member 47. This connector includes a small orifice 53 that meters the flow of air into the chamber. A transducer or pressure pickup 55 is positioned to sense the pressure of the gas between the gas pressure levitation device 41 and the surface 42 of the rail. This transducer is preferably of the electrical type, for example, it may take the form of the transducer shown in Patent 2,981,911 issued April 25, 1961, in the name of Alan Warnick and it is preferably positioned to sense the pressure of the gas within the chamber 48. To accomplish this it may be threaded into a bore positioned in the member 47.

The gas pressure levitation device 41 is connected to the supply pipe 34 by means of a conduit 61. This conduit has a spool valve, generally designated by the numeral 62, interposed between the supply pipe 34 and the plenum 45. The valve comprises a casing 63 and a spool 64 having a central reduced portion 65, and it is operated by a solenoid 67 contained within casing 68. The spool 64 has an enlarged end portion 71 that contains a section 72 fitting within the solenoid 64 and an outer enlarged head 73 that fits within the casing 68 and that will engage the end of solenoid 67 when the solenoid is fully energized. A spring 72 biases the enlarged head 73 of the spool valve against the end wall of the casing 68. When the valve is so positioned it is preferred that it be slightly opened so that a small supply of gas is supplied to the plenum 45 from the supply pipe 34. Although this is the preferred position of the valve, it could also be positioned to completely close off the air supply to the plenum 45 when the solenoid is not energized. A power supply and amplifier 81 are connected to the transducer 55 by means of leads 82 contained in sheath 83, and to the solenoid 67 by means of leads 84 and 85. It is to be understood that the means connecting the supply pipe 35 with the gas pressure levitation device 43 are identical with the means described above that connect the supply pipe 34 with the gas pressure levitation device 41.

In operation of the invention, the small stream of sensing air supplied to the chamber 48 through the supply pipe 51, connector 52 and orifice 53, provides a means for sensing the proximity of gas pressure levitation device 41 to the surface 42 of rail 12, or the proximity of gas pressure levitation device 43 to the surface 44 of rail 13. When the member 47 moves toward the surface 42, for example, due to unbalanced lateral loads on the vehicle, the pressure within the chamber 48 will increase. This increase in pressure is sensed by the transducer 55 which is connected to power supply and amplifier 81. This power supply and amplifier amplifies the signal from the transducer 55 and this amplified signal is fed to solenoid 67. When the solenoid 67 is energized the spool valve 62 is moved toward the open position. This, of course, increases the supply of gas flowing through the conduit 61 to the plenum 45 and the flow of gas through the orifices 46, thereby increasing the pressure of the film of gas under pressure between the member 47 and the surface 42. This increase in pressure resists the lateral movement of the vehicle toward the surface 42 of rail 12.

The invention may be equally applied to the problem of resisting the vertical forces that may be applied to the vehicle by aerodynamic lift conditions. Referring now to FIG. 5, a gas pressure levitation device 85 is shown positioned in opposed relationship to the under surface 87 of rail 13. The under surface of the rail may be in a substantially horizontal plane, but it need have only a substantial horizontal component. It is to be understood that a similar gas pressure levitation device would be positioned in opposed relationship to the under surface of the rail 12. The gas pressure levitation device 85 is identical with gas pressure levitation device 41 described in detail in relation to FIG. 4, but may be of smaller size. The gas pressure levitation device 85 is connected to the supply pipe 35 by means of a conduit 88 that has interposed therein the solenoid operated spool valve 62. The solenoid spool valve is in all respects identical to that described in relation to FIG. 3 and is operated by a power supply and amplifier connected to transducer 55.

A sensing stream of air is supplied to the chamber 48 from the supply pipe 35 by means of conduit 91. When the gas pressure levitation device 85 moves toward the surface 87 of rail 13 due to an upward force applied to the vehicle, the pressure of the gas between the levitation device 85 and the surface 87 increases as does the pressure of the gas within chamber 48. The pressure transducer 55 produces a signal that is a function of this increase in pressure. This signal is amplified by power supply and amplifier 81 and this amplified signal is fed to solenoid 67 which moves the solenoid valve 62 toward the open position thereby increasing the supply of gas under pressure fed to the gas pressure levitation device 85. This increases the supply of gas between the levitation device 85 and the surface 87 thereby resisting the upward force applied to the vehicle.

The gas pressure levitation devices may be supported in the vehicle 10 from the supply pipes 34 and 35. In FIG. 6 there is shown a means of supporting the gas pressure levitation devices 28 and 43 in opposed relationship to the surfaces of the rail 13. A pair of collars 101 and 102, are affixed to the supply pipe 35 which may form a longitudinal structural member of the vehicle. A frame member 103 may be supported from the collars 101 and 102 by a pair of torsion bars, one of which is shown at 104. A gas pressure levitation device, for example, gas pressure levitation device 28, is supported from the frame member 103 in opposed relationship to the substantially horizontal surface 27 of the rail 13 by means of gimbals 105 and 106, and a gas pressure levitation device positioned in opposed relationship to the substantially vertical surfaces of the rails may be similarly supported by gimbals. For example, as shown here, the gas pressure levitation device 43 is supported from the frame member 103 by gimbals 108. The conduit 37 for supplying gas under pressure to the gas pressure levitation device 28 is also shown. This type of suspension system or supporting system for the gas pressure levitation devices is more fully described and is claimed in copending application Serial No. 162,901 filed December 28, 1961, in the name of David J. Jay and assigned to the assignee of this invention. It is to be understood that the support system for the gas pressure levitation devices of this invention is not restricted to this type of system, but that this type of system is shown for illustrative purposes.

Although the means for controlling or restricting the lateral movement of the vehicle is shown in FIG. 3 and the means for restricting and controlling the vertical movement of the vehicle due to aerodynamic lift conditions is shown in FIG. 5, it is to be understood that these means may be combined in a vehicle so that both a means for restricting lateral movement and a means for restricting vertical movement due to aerodynamic conditions are provided. This may be seen in relation to FIG. 6 in which the gas pressure levitation device 85 shown in FIG. 5 is supported from the frame member 103.

FIGS. 3, 5 and 6 disclose only one grouping of gas pressure levitation devices disposed in a vehicle, but it is to be understood that a plurality of such groupings would ordinarily be employed spaced along the length of the vehicle.

The present invention thus provides means for resisting the lateral loads applied to a vehicle supported by gas under pressure, and/or a means for controlling the vertical movement of such a vehicle that is caused by aerodynamic lift conditions. The means for accomplishing these purposes conserves the gas supply of the vehicle.

It will be understood that the invention is not to be limited to the exact construction shown and described, but that various changes and modifications may be made without departing from the spirit and scope of the invention as defined in the appended claims.

I claim:

1. In a vehicle supported from a rail system by gas under pressure the combination comprising, a source of gas under pressure, means connected to said source of gas under pressure and positioned in opposed relationship to a surface of the rail system for supplying a film of gas under pressure between said means and the surface, and means interposed between said source of gas and said first mentioned means for increasing the supply of gas to said first mentioned means when said first mentioned means moves toward said surface.

2. In a vehicle supported from a rail system by gas under pressure, the combination comprising, a source of gas under pressure, a gas pressure levitation device positioned in opposed relationship to a surface of the rail system, and means connecting said source of gas under pressure and said gas pressure levitation device for increasing the supply of gas to said gas pressure levitation device when said gas pressure levitation device moves toward said surface.

3. In a vehicle supported from a rail system by gas under pressure, a gas pressure levitation device positioned, in opposed relationship to a surface of the rail system, a source of gas under pressure, means positioned adjacent the surface and said gas pressure levitation device for sensing the proximity of said gas pressure levitation device to the surface, and means positioned between said source of gas under pressure and said gas pressure levitation device and connected to said first mentioned means for increasing the supply of gas through said second mentioned means and to said gas pressure levitation device when said gas pressure levitation device moves toward said surface.

4. In a vehicle supported from a rail system by gas under pressure, a source of gas under pressure, first means positioned in opposed relationship to a surface of the rail system for supplying a film of gas under pressure between said first means and the surface, second means positioned adjacent the surface and said first means for sensing the proximity of said first means to the surface, and third means positioned between said source of gas under pressure and said first means and connected to said second means for increasing the supply of gas to said first means when said first means moves toward said surface.

5. In a vehicle supported from a rail system by gas under pressure, a gas pressure levitation device positioned in opposed relationship to a surface of the rail system, a source of gas under pressure, means connecting the gas pressure levitation device and the source of gas under pressure for supplying a sensing stream of gas between said gas pressure levitation device and the surface of the rail system, means positioned to sense the gas pressure between the gas pressure levitation device and the surface, and means connected to said source of gas under pressure and said gas pressure levitation device for increasing the supply of gas to the gas pressure levitation device in response to a signal supplied by said second mentioned means when the gas pressure between said gas pressure levitation device and said surface exceeds a selected value.

6. In a vehicle supported from a rail system by gas under pressure, a source of gas under pressure, first means positioned in opposed relationship to a surface of the rail system for supplying a film of gas under pressure between said first means and the surface, second means connecting said first means and the source of gas under pressure for supplying a sensing stream of gas between said first means and the surface of the rail system, third means positioned to sense the gas pressure between the first means and the surface, and fourth means connected to said source of gas under pressure and said first means for increasing the supply of gas to said first means in response to a signal supplied by said third means when the gas under pressure between said first means and said surface exceeds a selected value.

7. In a vehicle supported from a rail system by gas under pressure, a gas pressure levitation device positioned in opposed relationship to a surface of the rail system, said gas pressure levitation device having a chamber positioned therein adjacent said surface, a source of gas under pressure, means connecting the gas pressure levitation device and the source of gas under pressure for supplying a sensing stream of gas to said chamber, a transducer carried by said gas pressure levitation device and positioned within said chamber for sensing the pressure of the gas within said chamber, and means positioned between said source of gas under pressure and said gas pressure levitation device and connected to said transducer for increasing the supply of gas to said gas pressure levitation device when the gas pressure in said chamber sensed by said transducer exceeds a selected value.

8. In a vehicle supported from a rail system by gas under pressure, a gas pressure levitation device positioned in opposed relationship to a surface of said rail system, a source of gas under pressure, means connecting the gas pressure levitation device and the source of gas under pressure for supplying a sensing stream of gas between said gas pressure levitation device and the surface of the rail system, a transducer carried by said gas pressure levitation device for sensing the pressure of the gas between said gas pressure levitation device and said surface, a valve including a solenoid, said valve being connected to said source and to said gas pressure levitation device, and means connected to said transducer and to said solenoid for furnishing sufficient electrical power to move said valve toward the open position when the pressure between the gas pressure levitation device and the surface reaches a selected value.

9. In a vehicle supported from a rail system by gas under pressure, a gas pressure levitation device positioned in opposed relationship to a surface of said rail system, a source of gas under pressure, means connecting said source of gas under pressure and said gas pressure levitation device for supplying a sensing stream of gas between said gas pressure levitation device and the surface of the rail system, a pressure pickup positioned to sense the pressure of the gas between said gas pressure levitation device and said surface, a second means connecting said source of gas under pressure and said gas pressure levitation device, a valve positioned in said second means for restricting the flow of gas to said gas pressure levitation device through said second means, and means coupled to said pressure pickup and said valve for increasing the flow of gas through said valve when the pressure pickup senses a pressure in excess of a selected pressure.

10. In a mechanism carried and supported by a vehicle for counteracting lateral loads on said vehicle, said vehicle being supported from a rail system by gas under pressure, the combination comprising, a source of gas under pressure, a gas pressure levitation device positioned in opposed relationship to a surface of the rail system having a substantial vertical component, means connecting the gas pressure levitation device and the source of gas under pressure for supplying a sensing stream of gas between said gas pressure levitation device and the surface of the rail system, means positioned to sense the gas pressure between the gas pressure levitation device and the surface, and means connected to said source of gas under pressure and said gas pressure levitation device for increasing the supply of gas to the gas pressure levitation device in response to a signal supplied by said second mentioned means when the gas pressure between said gas pressure levitation device and said surface exceeds a selected value.

11. In a mechanism carried and supported by a vehicle for counteracting lateral loads on said vehicle, said vehicle being supported from a rail system by gas under pressure, the combination comprising, a source of gas under pressure, a first gas pressure levitation device positioned in opposed relationship to a first surface of the rail system having a substantial vertical component, a second gas pressure levitation device positioned in opposed relationship to a second surface of the rail system having a substantial vertical component, a source of gas under pressure, means connecting said source of gas under pressure with said first and second gas pressure levitation devices for supplying a sensing stream of air between said gas pressure levitation devices and surfaces of the rails, means positioned within each of said gas pressure levitation devices for sensing the pressure of the gas between said devices and the surfaces of the rail system, and means coupled to said first mentioned means and said source of gas under pressure for increasing the gas supply to either said first or second gas pressure levitation device when the gas pressure exceeds a certain level.

12. In a mechanism carried and supported by a vehicle for resisting upward forces on said vehicle, said vehicle being supported from a rail system by gas under pressure, the combination comprising, a source of gas under pressure, a gas pressure levitation device positioned in opposed relationship below a surface of the rail system having a substantial horizontal component, means connecting the gas pressure levitation device and the source of gas under pressure for supplying a sensing stream of gas between said gas pressure levitation device and the surface of the rail system, means positioned to sense the gas pressure between the gas pressure levitation device and the surface, and means connected to said source of gas under pressure and said gas pressure levitation device for increasing the supply of gas under pressure to the gas pressure levitation device in response to a signal supplied by said second mentioned means when the gas pressure between said gas pressure levitation device and said surface exceeds a selected value.

13. In a mechanism carried and supported by a vehicle for resisting lateral loads on said vehicle, said vehicle being supported from a rail system by means of gas under pressure, the combination comprising, a source of gas under pressure, first means positioned in opposed relationship to a surface of the rail system having a substantial vertical component for supplying a film of gas under pressure between said first means and the surface, second means positioned adjacent the surface and said first means for sensing the proximity of said first means to the surface, and third means positioned between said source of gas under pressure and said first means and connected to said second means for increasing the supply of gas under pressure to said first means when said first means moves toward said surface.

14. In a mechanism carried and supported by a vehicle for resisting upward forces on said vehicle, said vehicle being supported from a rail system by means of gas under pressure, the combination comprising, a source of gas under pressure, first means positioned in opposed relationship below a surface of the rail system having a substantial horizontal component for supplying a film of gas under pressure between said first means and the surface, second means positioned adjacent the surface and said first means for sensing the proximity of said first means to the surface, and third means positioned between said source of gas under pressure and said first means and connected to said second means for increasing the supply of gas under pressure to said first means when said first means moves toward said surface.

References Cited in the file of this patent

UNITED STATES PATENTS

| | | |
|---|---|---|
| 2,511,979 | Goddard | June 20, 1950 |
| 2,985,114 | Linder | May 23, 1961 |
| 3,013,505 | Burke | Dec. 19, 1961 |

FOREIGN PATENTS

| | | |
|---|---|---|
| 1,238,499 | France | July 4, 1960 |